US006990346B2

United States Patent
Zhu

(10) Patent No.: US 6,990,346 B2
(45) Date of Patent: Jan. 24, 2006

(54) METHOD FOR DIRECT RETRYING BASED ON MACRO DIVERSITY IN CDMA SYSTEM

(75) Inventor: Qing Zhu, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 333 days.

(21) Appl. No.: 10/445,538

(22) Filed: May 27, 2003

(65) Prior Publication Data

US 2004/0032840 A1 Feb. 19, 2004

Related U.S. Application Data

(63) Continuation of application No. PCT/CN01/00691, filed on May 8, 2001.

(30) Foreign Application Priority Data

Dec. 7, 2000 (CN) ........................................ 00127825 A

(51) Int. Cl.
*H04Q 7/20* (2006.01)

(52) U.S. Cl. ........................ 455/444; 455/436; 455/442; 455/446; 370/331

(58) Field of Classification Search ................ 455/436, 455/442, 443, 444, 446; 370/331, 333
See application file for complete search history.

(56) References Cited

U.S. PATENT DOCUMENTS

| | | | | |
|---|---|---|---|---|
| 5,287,545 A | * | 2/1994 | Kallin | 455/510 |
| 5,293,641 A | | 3/1994 | Kallin et al. | |
| 5,357,559 A | | 10/1994 | Kallin et al. | |
| 5,497,504 A | * | 3/1996 | Acampora et al. | 455/436 |
| 6,081,713 A | * | 6/2000 | Desgagne | 455/436 |
| 6,101,176 A | * | 8/2000 | Honkasalo et al. | 370/335 |
| 6,115,599 A | * | 9/2000 | Stilp | 455/404.1 |
| 6,330,447 B1 | * | 12/2001 | Hengeveld | 455/436 |
| 6,332,079 B1 | * | 12/2001 | Kim et al. | 455/446 |
| 6,445,924 B1 | * | 9/2002 | Rasanen | 455/437 |
| 6,487,411 B1 | * | 11/2002 | Laakso et al. | 455/437 |
| 6,546,250 B1 | * | 4/2003 | Turcotte et al. | 455/437 |
| 6,597,927 B1 | * | 7/2003 | Eswara et al. | 370/334 |
| 6,681,113 B1 | * | 1/2004 | Greene et al. | 455/453 |
| 2002/0082032 A1 | * | 6/2002 | Hunzinger | 455/510 |
| 2002/0142772 A1 | * | 10/2002 | Hunzinger | 455/436 |
| 2005/0059401 A1 | * | 3/2005 | Chen et al. | 455/437 |

* cited by examiner

*Primary Examiner*—Rafael Perez-Gutierrez
*Assistant Examiner*—Khawar Iqbal
(74) *Attorney, Agent, or Firm*—Dorsey & Whitney LLP

(57) ABSTRACT

A direct retrying method in a CDMA system based on macro diversity is provided. The conditions for direct retrying are determined. The number of the cells, which are previously requested for an admission, is obtained. The cells are determined by using the cell information designed by a cell network as an auxiliary decision. The selected cells having the same coverage are re-divided to obtain different sets of the cells. One cell set is selected from the different cell sets as a target cell set of the direct retrying, and the resources are requested from all of the cells in the target cell set of the direct retrying. If the admission of one cell is successful, the direct retrying is successful. The method significantly increases a success rate of direct retrying, decreases the number of the frequency switching times after the mobile station enters a dedicated channel, and optimizes the system performance.

13 Claims, 2 Drawing Sheets

METHOD FOR DIRECT RETRYING BASED ON MACRO DIVERSITY IN CDMA SYSTEM

CROSS-REFERENCE TO RELATED APPLICATION

This utility patent application is a continuation application and claims priority of the PCT International Patent Application, serial number PCT/CN01/00691, filed on May 8, 2001, which claims the priority of the Chinese patent application, serial number CN 00127825.8, filed on Dec. 7, 2000; subject matter of which are incorporated herewith by reference.

FIELD OF THE INVENTION

The invention relates to wireless mobile communication technology, more particularly, it relates to a method for retrying directly in a CDMA system based on macro diversity.

BACKGROUND OF THE INVENTION

CDMA (Code Division Multiple Access) is a spread spectrum communication technology, and it is used mainly for military communication at its initial stage. Because of its excellent performances, CDMA is widely used in the commercial communication area. Also, commercial CDMA cellular mobile communication systems have already been operated in the telecommunication networks.

In a CDMA system, the same carrier frequency can be shared by different users, and they are distinguished from each other by using different code words. Likewise, a user can use a plurality of code words to communicate simultaneously on a certain frequency. If these code words belong to different cells, a plurality of wireless links will communicate simultaneously. The state of a plurality of wireless links existing simultaneously between a mobile station and a base station is referred to as macro diversity. Macro diversity allows communication between a mobile station and a base station not to be interrupted during a switch between the same frequency. Meanwhile, because of utilization of diversity technology, a mobile station and a base station can obtain better link quality.

When a mobile station initializes a call and makes a request for accessing, a base station performs an admission control. An admission control is a rather complicated procedure which has to consider a variety of factors. In a CDMA system, one of the objectives of an admission control is to ensure an idle wireless resource for an expected SIR and bit rate. When a mobile station initializes a call in a new cell by a new calling or switching, an admission control is usually performed. Also, when a mobile station asks to dynamically reassign channels for reasons such as a change of service type during communication, an admission control is also performed. A CDMA system is a self-interfering system. While considering wireless resources, system interference affected by a user access is generally considered at the same time. When wireless resources of a certain cell are limited or the load thereof is too heavy, an admission of a mobile station may be failed. However, the failure of a cell does not necessarily mean that the other cells in the system do not possess resources. A mobile station may be able to move to a certain suitable cell, thereby accessing or communicating continuously. A procedure after an admission of an accessed cell or after a current cell being failure but a mobile station accessing to another cell under control of a base station, is referred to as direct retrying, also directional retrying.

In GSM, when a dedicated channel is assigned to a mobile station, and no dedicated channel resources are possessed by an access cell, direct retrying (or referred to as directional retrying) will be implemented. When accessing, a mobile station carries a measurement report of adjacent cells, which provides a foundation for selecting a target cell by direct retrying after access is failed. Patents, such as WO9856203 and U.S. Pat. No. 5,293,641, have discussed direct retrying in great extent. However, in some mobile communication systems or at some moments, direct retrying may not be supported by measurement reports. At this time, other methods may be used to select a target cell to improve a success rate of a user access, to decrease the number of frequency switch times and signaling interacting caused by sliding after a mobile station is accessed successfully, thereby optimizing system performance.

SUMMARY OF THE INVENTION

To solve the above and other problems, the present invention provides a method for direct retrying in a CDMA system based on macro diversity for improving success rate of a user access, and also decreasing the number of frequency switching times and signaling interacting caused by switching after a mobile station is accessed successfully, optimizing system performance.

The method for direct retrying in a CDMA system based on macro diversity comprises the steps of:

(1) providing a condition for direct retrying, the condition including an admission of a mobile station being failed;

(2) obtaining at least one cell in which the admission was requested;

(3) determining all of cells having same coverage as the at least one cell obtained in step (2);

(4) re-dividing the cells having the same coverage according to frequencies to obtain different sets of cells;

(5) selecting one cell set from the different cell sets as a target cell set for direct retrying;

(6) requesting resources from all of the cells in the target cell set for the direct retrying;

(7) if an admission of at least one cell within the target cell set for the direct retrying is successful, performing the direct retrying, if the admission of at least one cell within the target cell set for the direct retrying is failed, then selecting another cell set from the different cell sets as a target cell set for the direct retrying and repeating steps (6) and (7).

DETAILED DESCRIPTION OF THE PREFERRED EMBODIMENTS

If a mobile station initiates a call in a certain cell of a mobile communication system and requests to establish a link but fails to implement a cell admission for reasons such as limited cell resources, etc., a base station directs the mobile station to access the other cells. In some mobile communication systems (for example, GSMs), a target cell is selected by the base station based on the measurement information of the mobile station. However, under some circumstances, measurement reports required by the base station for making decision cannot be obtained. The present invention provides direct retrying without the requirement of measurement reports. The present method also provides direct retrying if channel reconfiguration of the mobile station is failed.

It is noted that the term "cell" used herein is defined as a cell in a CDMA system, which is determined by a down link main scramble code of a carrier. In other words, there are two carriers in one cell, it will be considered or defined as two cells in the present invention.

In a CDMA system, when a mobile station requests an admission (including re-admission), there are at least one target cell or target cell set. All the cells in a target cell set have the same frequency. In general, target cells are cells, that the mobile station selects to reside or communicates previously. The probability that a base station locates in the areas covered by these cells is rather large. It is desirable that after admission fails, the information of these cells are used sufficiently to select a target cell for direct retrying, thereby increasing a success rate of the direct retrying.

In a CDMA system, because the same carrier frequency can be shared by different cells, the mobile station can request resources in one or more cells simultaneously. For the same reason, the mobile station can keep contact with transceivers of one or more cells. Therefore, when implementing an admission control, there is a target cell set, in which the cells have the same frequency, and the mobile station requests the resources in these cells. It is desired that when an admission to these cells fails, the information of these cells are used sufficiently for the direct retrying.

Figure 1:
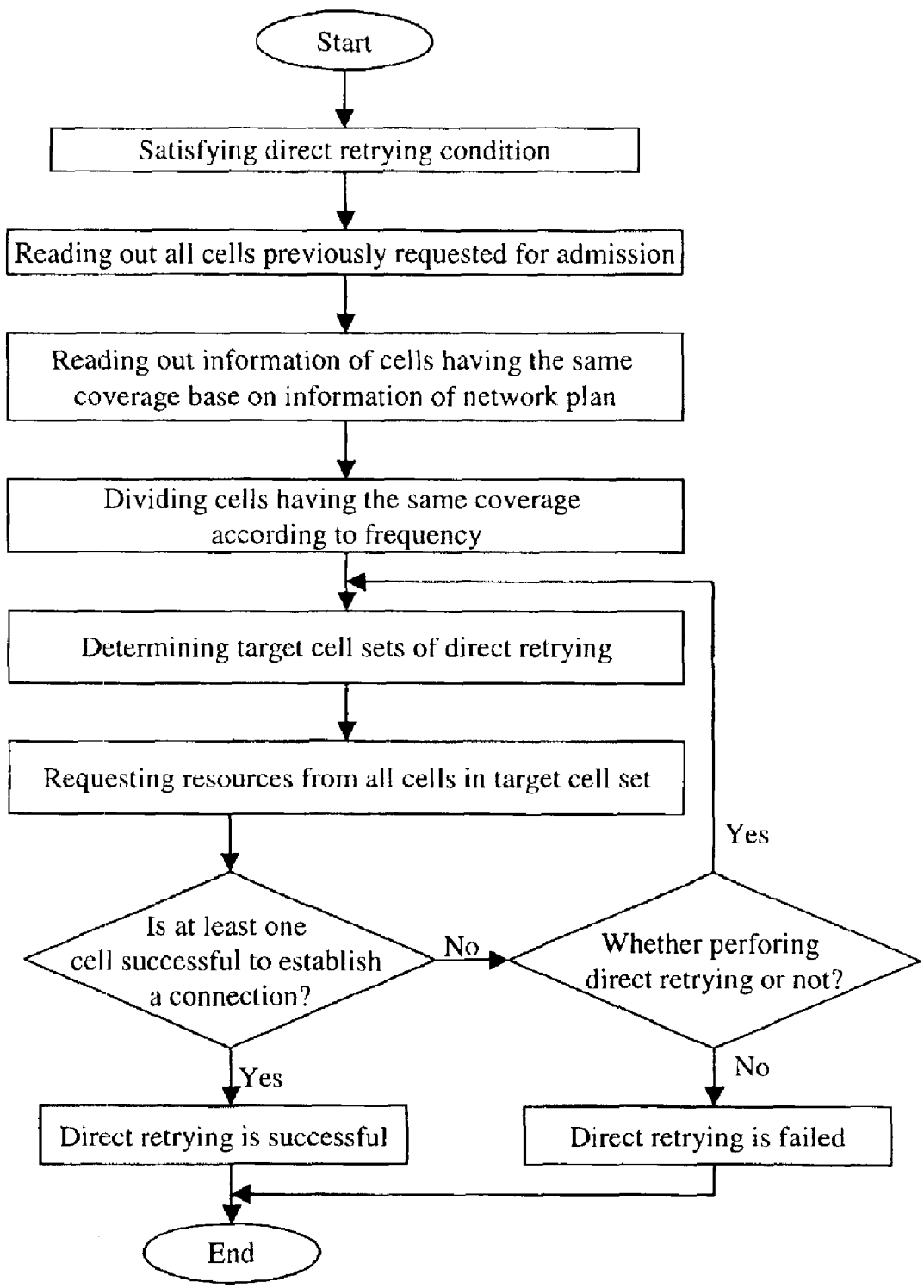
FIG. 1 is a flow chart of a direct retrying method based on macro diversity in accordance with the principles of the present invention.

As shown in FIG. 1, a method for direct retrying, comprises the steps of:

(1) providing a condition for direct retrying, the condition including an admission of a mobile station being failed;

(2) obtaining at least one cell in which the admission was requested;

(3) determining all of cells having same coverage as the at least one cell obtained in step (2);

(4) re-dividing the cells having the same coverage according to frequencies to obtain different sets of cells;

(5) selecting one cell set from the different cell sets as a target cell set for direct retrying;

(6) requesting resources from all of the cells in the target cell set for the direct retrying;

(7) if an admission of at least one cell within the target cell set for the direct retrying is successful, performing the direct retrying, if the admission of at least one cell within the target cell set for the direct retrying is failed, then selecting another cell set from the different cell sets as a target cell set for the direct retrying and repeating steps (6) and (7).

The condition determined in step (1) for deciding the direct retrying also comprises a condition that causes interruption of a link of the mobile station, or that a re-configuration during a communication procedure is failed.

Obtaining the number of the cells, which are previously requested for the admission in step (2) comprises the number of all of the cells in which the accessed mobile station requests for an admission, or the number of the cells in an active set for the mobile station before direct retrying.

Using the cell information in step (3) is referred to implementing an auxiliary decision of the direct retrying based on a cell distribution condition in a network.

When implementing direct retrying, cells with the same coverage are considered preferably. During dividing the cells with the same coverage by frequencies, a cell set of a certain frequency is outputted for each direct retrying decision.

When requesting resources from all of the cells in the target cell set in the step (6), all of the cells in the target cell set request for resources simultaneously.

After an admission fails and another target cell set is selected for retrying for an admission again in step (7), the direct retrying can also be implemented in the cells of the cell sets having another carrier frequency.

When there are a plurality of carrier frequencies in a cell previously requested for an admission, the cell is divided into a number of cells, wherein the number equals to the number of the carrier frequencies, so that each cell has one carrier frequency.

Figure 2:
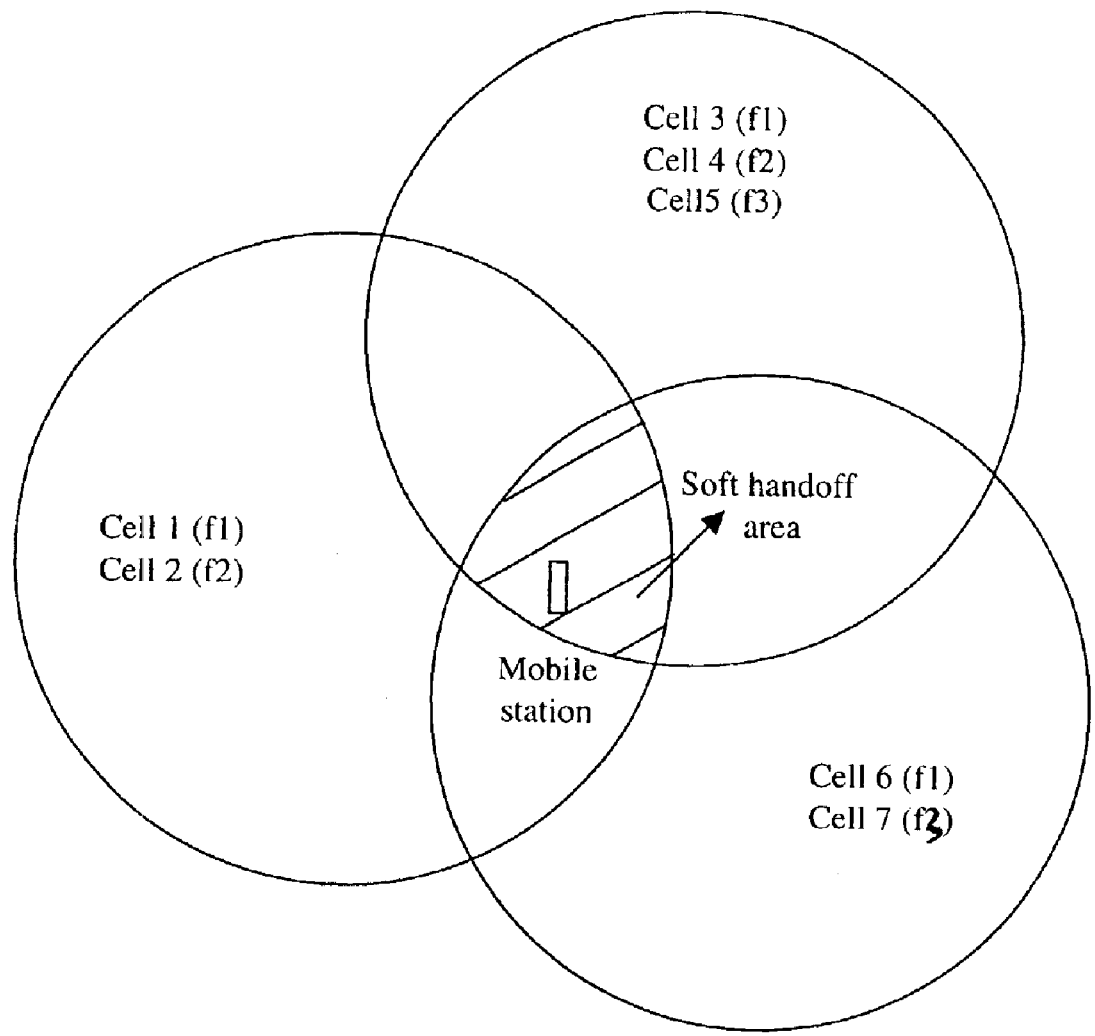
FIG. 2 is a diagram of a base station distribution for implementing switching by utilizing the method of the invention.

In FIG. 2, an example of three base stations and seven cells is illustrated. The frequencies of the carriers are as follows:

Cell 1: f1, Cell 2: f2, Cells 1 and 2 having the same coverage.

Cell 3: f1, Cell 4: f2, Cell 5: f3, Cells 3, 4, and 5 having the same coverage.

Cell 6: f1, Cell 7: f3, Cells 6 and 7 having the same coverage.

As shown in FIG. 2, the mobile station locates initially in a soft handoff area, i.e., the shadow portion, and communicates on the carrier frequency f1. The mobile station is in a soft handoff state and communicates simultaneously with Cells 1, 3, and 6. If a service feature of the mobile station is changed at this time, a re-configuration of channels will be performed. Assuming that all of the re-configurations of the channels of Cells 1, 3, and 6 fail, a decision of direct retrying will be implemented. The number of Cells 1, 3, and 6 connected previously with the mobile station is firstly obtained. It is known that Cells 1, 3, 6 and Cells 2, 4, 5, 7 have the same coverage based on a network design. Two cell sets can be obtained according to re-classifying the frequencies of the cells: f2 {Cell 2, Cell 4}, f3 {Cell 5, Cell 7}. A Cell f2 is selected among them for using as a target cell set of the direct retrying, and the resources are requested by the mobile station based on the target cell set given by the direct retrying. If at least one cell between Cell 2 or Cell 4 accesses successfully, then the retrying is successful, if both of them access successfully, it enters into a macro diversity state. If requesting the resources of Cells 2 and 4 fails, the retrying is failed at this time and it will be retried again in the cell set f3.

It is evident that under the same condition, the probability of the failure of requesting two cells is smaller than that of requesting one cell by the mobile station for the resources. Therefore, the success rate of the direct retrying based on the concept of macro diversity is higher than the success rate of the general direct retrying. As a result, the method for the direct retrying provided by the invention has better performance.

INDUSTRY APPLICABILITY

Because the present direct retrying method in a CDMA system is based on macro diversity, the present invention provides at least the following advantages:

(1) Success rate of a user access in a CDMA mobile communication system is increased, and the probability caused by a user line cut off due to re-configuration of channels is decreased. The number of frequency switching times and signaling interaction caused by the frequency switching after switching successfully is also decreased. The system performance is optimized.

(2) Concept of making an auxiliary decision from an over-all cell design in a cell network is used, and a concept of the same cell coverage is used. Thus accuracy and reasonableness of the position of a mobile station is significantly increased;

(3) A better quality of links is provided for a mobile station.

What is claimed is:

1. A method for direct retrying in a CDMA system based on macro diversity, comprising the steps of:
   (1) providing a condition for direct retrying, the condition including an admission of a mobile station being failed;
   (2) obtaining at least one cell in which the admission was requested;
   (3) determining all of cells having same coverage as the at least one cell obtained in step (2);
   (4) re-dividing the cells having the same coverage according to frequencies to obtain different sets of cells;
   (5) selecting one cell set from the different cell sets as a target cell set for direct retrying;
   (6) requesting resources from all of the cells in the target cell set for the direct retrying;
   (7) if an admission of at least one cell within the target cell set for the direct retrying is successful, performing the direct retrying, if the admission of at least one cell within the target cell set for the direct retrying is failed, then selecting another cell set from the different cell sets as a target cell set for the direct retrying and repeating steps (6) and (7).

2. The direct retrying method as recited in claim 1, wherein the step (2) comprises obtaining a number of all of cells of which mobile station has requested for an admission.

3. The direct retrying method as recited in claim 1, wherein the step (2) comprises obtaining a number of cells in an active set for the mobile station before direct retrying.

4. The direct retrying method as recited in claim 1, wherein the step (3) comprises implementing an auxiliary decision of direct retrying based on a cell distribution condition in a cell network.

5. The direct retrying method as recited in claim 1, wherein when implementing direct retrying, cells with same coverage are considered preferably.

6. The direct retrying method as recited in claim 1, wherein when implementing direct retrying, when dividing the cells with same coverage by frequencies, a cell set of a certain frequency is outputted for each direct retrying decision.

7. The direct retrying method as recited in claim 5, wherein when implementing direct retrying, when dividing the cells with same coverage by frequencies, a cell set of a certain frequency is outputted for each direct retrying decision.

8. The direct retrying method as recited in claim 1, wherein in the step (6), all of the cells in the target cell set request for the resources simultaneously.

9. The direct retrying method as recited in claim 1, wherein in the step (7), after an admission fails and another target cell set is selected for retrying for an admission again, the direct retrying is implemented in cells of a cell set having another carrier frequency.

10. The direct retrying method as recited in claim 1, wherein when there are a plurality of carrier frequencies in a cell previously requested for an admission, the cell is divided into a number of cells, wherein the number equals to the number of the carrier frequencies, so that each cell has one carrier frequency.

11. The direct retrying method as recited in claim 10, wherein when there are a plurality of carrier frequencies in a cell previously requested for an admission, the cell is divided into a number of cells, wherein the number equals to the number of the carrier frequencies, so that each cell has one carrier frequency.

12. The direct retrying method as recited in claim 1, wherein the condition for direct retrying includes a condition that causes an interruption of a link of the mobile station.

13. The direct retrying method as recited in claim 1, wherein the condition for direct retrying includes a condition that a re-configuration during a communication procedure is failed.

* * * * *